M. WILLIAMS.
Thrashing and Winnowing Machine.
No. 53,370.
2 Sheets—Sheet 1.
Patented March 20, 1866.
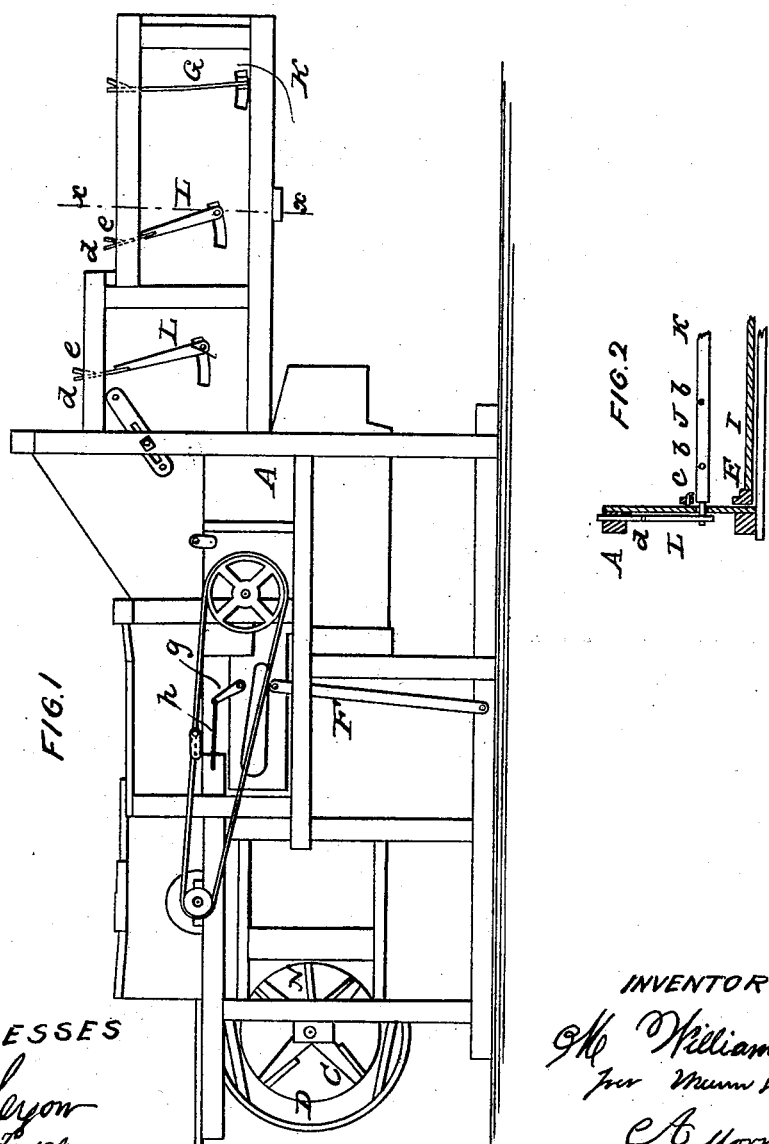

M. WILLIAMS.
Thrashing and Winnowing Machine.
No. 53,370.
2 Sheets—Sheet 2.
Patented March 20, 1866.
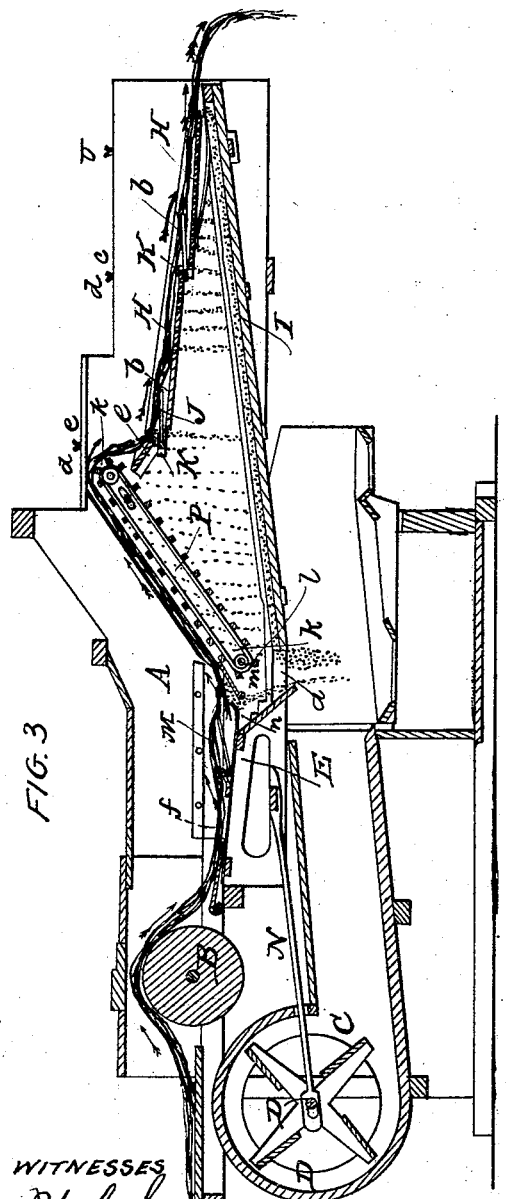
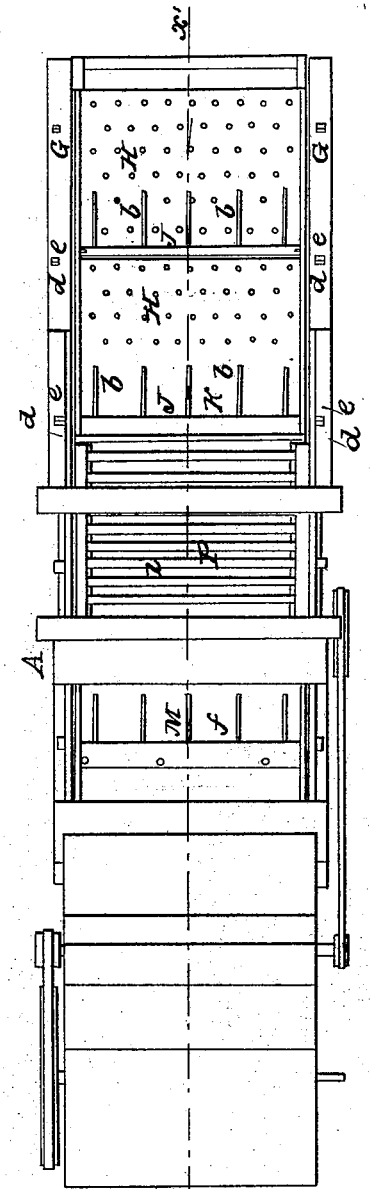

UNITED STATES PATENT OFFICE.

MARTIN WILLIAMS, OF CHARLESTON FOUR CORNERS, NEW YORK.

IMPROVEMENT IN THRASHING AND WINNOWING MACHINES.

Specification forming part of Letters Patent No. 53,370, dated March 20, 1866.

*To all whom it may concern:*

Be it known that I, MARTIN WILLIAMS, of Charleston Four Corners, in the county of Montgomery and State of New York, have invented a new and Improved Thrashing and Winnowing Machine; and I do hereby declare that the following is a full, clear, and exact description thereof, which will enable others skilled in the art to make and use the same, reference being had to the accompanying drawings, forming part of this specification, in which—

Figure 1, Sheet No. 1, is a side view of my invention; Fig. 2, a section of the same, taken in the line $x\,x$, Fig. 1; Fig. 3, a side sectional view of the same, taken in the line $x'\,x'$, Fig. 4; Fig. 4, a plan or top view of the same.

Similar letters of reference indicate like parts

This invention relates to certain new and useful improvements in discharging the straw and grain from thrashing-machines, as hereinafter fully shown and described, whereby the loose grain is thoroughly separated from the straw, and the straw and grain discharged from the machine at different points, and a free discharge of the straw insured, the latter being prevented from choking or clogging up the machine, a contingency hitherto of not unfrequent occurrence.

A represents the case of the machine, which may be constructed in any proper manner to contain the working parts.

B is the thrashing-cylinder, which may be constructed in the usual manner; and C is the fan, placed within a case, D, and arranged in such relation with the thrashing-cylinder as to subject the thrashed grain to a suitable blast.

The thrashing mechanism may be constructed in the usual way, and therefore does not require a special description.

E represents a vibrating frame, which is hung upon pivoted uprights F F, one at each side of the case A, and suspended at its outer end by straps G G, one at each side of the case A. This frame E contains screens H H at its outer part, and also an inclined board or chute, I, which is below said screens, and which conducts the grain to the discharge-aperture $a$, as shown in Fig. 3.

The screens H H are provided with shakers J, composed of teeth $b$, inserted in bars K, which are placed transversely in the frame E and work on pivots $c$, the ends of said bars passing through curved slots in the side of the case A and attached to pendants L, the upper ends of which are attached to the top of the case by straps $d$, of leather or other suitable flexible material, passing through mortises in the top bars of the case and secured in said mortises by keys or wedges $e$.

On the rear part of the frame E there is an inclined plate, $f$, which has a shaker, M, upon it, arranged like the shakers J, but operated differently, the bar of the shaker M having an arm, $g$, attached to one end of it, the upper end of which is connected by a rod, $h$, to the case A, as shown in Fig. 1. This frame E is vibrated by a pitman, N, connected with a crank, O, on the shaft of the fan C, and as said frame is vibrated the shakers have an up-and-down movement communicated to them, their teeth working from the bars as centers, and these teeth shake the straw and loosen the grain therefrom, and also have a tendency to feed the straw along and cause it to be discharged from the end of frame E, the loose grain passing through the screens H H and falling upon the chute I, which conducts it to the discharge-opening $a$.

P is an inclined conveyer, composed of slats $i$, attached to endless belts $j$, which work over pulleys $k\,k$ on shafts $l\,l$. This conveyer also serves the office of a screen, and it receives the straw from the plate $f$ and conducts it up to the screens H H. At the lower end of this inclined conveyer there is a plate, Q, which is fitted on a shaft, $m$, placed transversely in the case A. This plate Q laps over the lower end of the conveyer P, and is directly in front of the plate $f$, a space, $n$, being allowed between $f$ and Q to allow the grain to pass down through the discharge-opening $a$. (See Fig. 3.)

The plate Q performs an important function. It prevents the ends of the straw from passing between the slats $i$ of the conveyer by deflecting them upward, so that they will have a position parallel with the conveyer. Thus a free discharge of the straw from the machine is insured, and all choking or clogging of the parts effectually prevented.

By having the pendants L connected by straps $d$ to the case A, and the outer end of the frame E suspended by straps G G, and all the straps secured to the case by keys or wedges e, and the frame supported by the pivoted uprights F F at its rear part, the frame E and the shakers are made to operate smoothly and without noise or any appreciable degree of friction.

Having thus described my invention, I claim as new and desire to secure by Letters Patent—

1. Supporting the frame E upon pivoted uprights F F in connection with the straps G G at the outer end of said frame and operating the frame by means of a pitman and crank from the shaft of the fan C, all arranged substantially as and for the purpose set forth.

2. Attaching the swinging pendants L to the case A by means of straps d and keys or wedges e, substantially as and for the purpose specified.

3. The plate Q applied to the lower end of the conveyer P, substantially as and for the purpose set forth.

The above specification of my invention signed by me this 23d day of October, 1865.

MARTIN WILLIAMS.

Witnesses:
  M. M. LIVINGSTON,
  C. L. TOPLIFF.